United States Patent
Bengs et al.

(10) Patent No.: US 6,323,265 B1
(45) Date of Patent: Nov. 27, 2001

(54) THERMOPLASTIC MIXTURE CONTAINING 1,4-α-D-POLYGLUCANE, METHOD FOR MAKING THE SAME AND USE THEREOF

(75) Inventors: Holger Bengs, Frankfurt; Jürgen Grande, Bad Soden; Gitte Böhm, Frankfurt, all of (DE)

(73) Assignee: Aventis Research & Technologies GmbH & Co KG (DE)

( * ) Notice: Subject to any disclaimer, the term of this patent is extended or adjusted under 35 U.S.C. 154(b) by 0 days.

(21) Appl. No.: 09/462,231

(22) PCT Filed: Jun. 29, 1998

(86) PCT No.: PCT/EP98/03960

§ 371 Date: Mar. 13, 2000

§ 102(e) Date: Mar. 13, 2000

(87) PCT Pub. No.: WO99/02600

PCT Pub. Date: Jan. 21, 1999

(30) Foreign Application Priority Data

Jul. 9, 1997 (DE) .............................................. 197 29 273

(51) Int. Cl.[7] .................................................. C08K 5/15
(52) U.S. Cl. .................................................. 524/56
(58) Field of Search .................................................. 524/56

(56) References Cited

U.S. PATENT DOCUMENTS

| | | | | |
|---|---|---|---|---|
| 4,002,173 | * | 1/1977 | Manning | 128/296 |
| 4,309,996 | * | 1/1982 | Theeuwes | 128/260 |
| 4,627,850 | * | 12/1986 | Deters | 604/892 |
| 5,654,005 | * | 8/1997 | Chen | 424/480 |
| 5,837,379 | * | 11/1998 | Chen | 424/465 |

FOREIGN PATENT DOCUMENTS

| | | |
|---|---|---|
| 1720172 | 6/1971 | (DE) . |
| 0733647 | 3/1995 | (DE) . |
| 4420223 | 5/1995 | (DE) . |
| 4417879 | 11/1995 | (DE) . |
| 0327505 | 8/1989 | (EP) . |
| 0599535 | 6/1994 | (EP) . |
| 0709030 | 10/1994 | (EP) . |

OTHER PUBLICATIONS

Lehninger, A. L., *Biochemistry*, N.Y., N.Y., Worth Publishers, 1976, pp. 645–646 (XP–002083919).
Mahler, H. R., et al, *Biological Chemistry*, N.Y., N.Y., Harper & Row Publishers, 1971, pp. 500–501 (XP–002083920).

* cited by examiner

*Primary Examiner*—Paul R. Michl
(74) *Attorney, Agent, or Firm*—Connolly Bove Lodge & Hutz LLP

(57) ABSTRACT

1,4-α-D-Polyglucan-based thermoplastic mixture, process for the preparation and use thereof The present invention relates to a thermoplastic mixture based on biopolymers obtainable by preparing and mixing
(A) 100 parts by weight of a biocatalytically produced 1,4-α-D-polyglucans,
(B) up to 400 parts by weight of a melt-processable polymeric material different from (A),
(C) water in an amount sufficient for plastification of the mixture,
(D) at least one plasticizer in an amount of 10 parts by weight up to half the total of the parts by weight of (A) and (B), and
(E) where appropriate up to ((A)+(B)) parts by weight of other conventional additives, where the water content of components (A) and (B) has been corrected to zero by calculation where the plastification takes place with introduction of thermal and mechanical energy, to the use of the mixture for producing essentially biodegradable moldings and sheets, and to a process for preparing the mixture.

19 Claims, No Drawings

THERMOPLASTIC MIXTURE CONTAINING 1,4-α-D-POLYGLUCANE, METHOD FOR MAKING THE SAME AND USE THEREOF

DESCRIPTION 1,4-α-D-Polyglucan-based thermoplastic mixture, process for the preparation and use thereof.

The invention relates to 1,4-α-D-polyglucan-based thermoplastic mixtures, to the preparation of such mixtures and to the use of these mixtures for producing biodegradable moldings such as molded parts or sheets. The present invention particularly relates to those thermoplastic mixtures where the 1,4-α-D-polyglucan employed has been produced biocatalytically.

The use of materials based on renewable raw materials has increased in importance and extent in recent years because of various advantages. Such biopolymers such as, for example, starch or protein etc. are, in contrast to petroleum-based polymers such as, for example, polyethylene, polypropylene or polystyrene etc., biodegradable. In addition, biopolymers can be obtained without restriction, whereas petroleum-based polymers are available to only a finite extent because of the limited availability of petroleum.

Biopolymers often result as by-products or waste products of the production of other products, for example in the vegetable kingdom as skeletal substances in plants and in production of foodstuffs.

In addition, biopolymers are $CO_2$-neutral, i.e. breakdown thereof does not result in harmful by-products contributing to the greenhouse effect.

During the increase in the use of biopolymers, especially starch, as natural and thus physiologically tolerated and degradable materials for a wide range of applications, processes have been developed to make it possible to process starch by known plastic processing techniques such as, for example, injection molding and extrusion.

Thus, for example, EP 0 599 535, WO90/05161 and WO92/04408 describe processes for producing thermoplastic starch from native, i.e. naturally occurring, starch and derivatives thereof with the addition of water, plasticizers and, where appropriate, other additives with exposure to heat and mechanical energy, and the use thereof for producing moldings.

Inter alia, the use of thermoplastic starch for producing sausage casings (EP 0 709 030) and casings for processing meat (U.S. Pat. No. 2,729,565) is known. Native starches employed in these cases too.

Despite these considerable advantages of biopolymers compared with conventional synthetic polymers, unrestricted application thereof has not been possible. A significant reason for this is that biopolymers, like all naturally occurring substances, show considerable variations in constitution and structure, and therefore the required reproducibility and thus constant product quality is not ensured.

Thus, starch, as one of the promising representatives of the renewable raw materials, shows an exceptionally inhomogeneous constitution and composition. Depending on the origin (natural source) of the starch, its content of its constituents amylose and amylopectin varies considerably.

In addition, wide molecular weight distributions may be shown by amylose, a linear 1,4-linked poly-α-D-glucan which has a molecular weight of about 50,000–150,000 dalton, and amylopectin, a highly branched 1,4- and 1,6- linked polyglucan which has a molecular weight of about 300,000–2,000,000 dalton.

There is no fixed boundary between highly branched and linear and therefore a plant may have a wide range of variation of the branching in the starch, which makes a sharp differentiation virtually impossible.

The ratio of amylose to amylopectin varies depending on plant origin. For example, starch from potatoes contains 20% by weight amylose and about 80% by weight amylopectin, whereas starch from corn comprises about 50% by weight amylose and 50% by weight amylopectin. In addition, the ratio within one plant varies depending on the soil characteristics, fertilizer uptake, seasonal climatic differences etc.

Besides this pronounced structural inhomogeneity, which may be expressed, as described, by wide molecular weight distributions or mixtures of polymers differing in spatial arrangement, biopolymers contain other constituents such as low molecular weight compounds, for example fats and oils, which can be removed from the biopolymers only with difficulty and have disadvantageous effects on further processing.

Attempts have therefore been made to produce biopolymers, for example polysaccharides and starches, by fermentation using microorganisms (WO95/31553).

However, the biopolymers obtained in this way likewise have a wide variation in molecular weight and defined reproduction thereof is impossible.

In addition, after this process the biopolymers are obtained in a mixture with the microorganisms used or residues thereof, and the residues of the nutrient medium required for the fermentation. The removal, especially when the resulting product is inside the cells and disruption of the microorganism is first necessary, is very elaborate, and in some cases impurities cannot be completely eliminated.

In addition, only limited amounts of biopolymer can be produced by fermentation, a very low space-time yield inter alia being responsible for this.

Attempts have also been made to optimize starches or other biopolymers by genetic manipulation of the plants from which the biopolymers are obtained. Thus, for example, WO94/03049 describes the production and use of a starch which has a high amylose content and can be obtained from genetically manipulated corn. In spite of this, the described disadvantages concerning the homogeneity of the natural polymers and concerning the contaminations with other natural components remain.

However, it is known from polymer processing by conventional plastics processing techniques that the reproducibility and quality depend crucially on the homogeneity and purity of the starting materials. To ensure products of high quality, it must be possible clearly to define and characterize these starting materials.

It is therefore an object of the present invention to provide a thermoplastic mixture based on biopolymers which does not have the abovementioned disadvantages and with which moldings of constant quality can be produced reproducibly.

It is particularly intended that the moldings producible in this way have improved properties such as excellent mechanical properties and good barrier properties toward gases and liquids.

This object is achieved by a mixture having the features of claim 1. The dependent claims relate to preferred embodiments.

The provision of a thermoplastic mixture obtainable by mixing 100 parts by weight of a biocatalytically produced 1,4-α-polyglucan (A), up to 400 parts by weight of a melt-processable polymeric material (B) different from (A), where the water content of (A) and (B) is corrected to zero percent by calculation, water (C) in an amount sufficient for plastification, at least one plasticizer (D) in an amount in the range from 10 parts by weight up to half the total of the parts by weight of (A) and (B), and, where appropriate, up to (A)+(B) parts by weight of other conventional additives makes it possible to produce, in a way which was not directly predictable, to produce a melt-processable mixture based on biopolymers which has excellent melt-processing properties, can be obtained reproducibily and in constant quality, and can thus be processed to molded parts likewise of constant quality.

A process for producing a thermoplastic mixture for extrudates or granules, and the use of the thermoplastic mixture, was also an object of the invention.

The 1,4-α-D-polyglucan employed according to the invention as component (A) is produced biocatalytically.

1,4-α-Polyglucan is, like amylose, constituted from 1,4-α-glycosidically linked glucose units and is linear.

In contrast to amylose, which is very soluble in water even in the high molecular weight state, corresponding biocatalytically produced 1,4-α-D-polyglucan is insoluble in water.

Unlike starch and amylose from native starch, which vary greatly in quality depending on the plant variety, location of origin, cultivation conditions etc., biocatalytically produced 1,4-α-polyglucan is of constant uniform quality.

Another advantage by comparison with native starch is that biocatalytically produced 1,4-α-polyglucan does not, unlike starch, result in the form of grains which may make uniform disruption during the melt processing difficult and, if the disruption is inadequate, may result in products of low quality.

Because of the very low solubility in water, 1,4-α-polyglucan is an ideal natural material for applications in which the swellability or the water uptake represent critical parameters, for example in food packagings.

In summary, it can be stated that, in contrast to starch, biotechnologically produced 1,4-α-polyglucan results in homogeneous quality, has better processability and thus results in products of high and constant quality.

1,4-α-D-Polyglucan prepared by biocatalysis, also called biotransformation, means for the purpose of the invention that the 1,4-α-D-polyglucan is prepared by catalytic reaction of monomeric basic building blocks such as oligomeric saccharides, for example mono- and disaccharides, by using a so-called biocatalyst, normally an enzyme, under suitable conditions.

Polyglucan obtained by biocatalytic processes is distinguished by a very narrow molecular weight distribution.

One measure of the molecular weight distrbution is the heterogeneity U with $U=(M_w/M_n)-1$, where $M_w/M_n$ is also referred to as the polydispersity.

If a polymer comprises only polymer chains of uniform length, $M_w$ and $M_n$ are identical and $M_w/M_n$ is 1. The value of the heterogeneity U in this case is 0. This means that as the heterogeneity of the polymer increases, the value of U becomes further from zero.

The 1,4-α-D-polyglucans used according to the invention normally have a value for U of about 0.1–2.0, preferably about 0.2–1 and particularly preferably about 0.2–0.8. This corresponds to polydispersities of about 1.1–3.0, 1.2–2 and 1.2–1.8.

By comparison with this, the range of polydispersities obtained in free-radical polymerization is 2–10, in so-called living anionic polymerization is 1.1–1.8 and in polycondensation is 2–10.

Thus the 1,4-α-D-polyglucans used according to the invention have molecular weight distributions comparable to those of polymers produced by synthesis.

It is also possible as required to prepare in a defined manner polyglucans which have different molecular weights and, moreover, have no branches and crosslinks and are uniformly linear.

Impurities such as oils or fats and residues of microorganisms etc. which are unavoidable in native starch or on production by fermentation are precluded because of the reaction conditions.

It is possible in principle to use for preparing the polyglucan employed according to the invention any enzyme which forms 1,4-α-polyglucan from suitable basic building blocks. Suitable examples are glycosyltransferases such as amylosucrases and phosphorylases.

One process for the biocatalytic preparation of 1,4-α-polyglucan is described, for example, in WO95/31553.

In this process, a sucrose solution is mixed with amylosucrase to form 1,4-α-polyglucan and fructose directly by cleavage of the saccharide linkage. The fructose formed as by-product can easily be removed and used further.

The thermoplastic mixture contains according to the invention 20–100 parts by weight, preferably 40–80 parts by weight, of 1,4-α-polyglucan.

The molecular weights $M_w$ of the polyglucans used according to the invention may vary over a wide range depending on the purpose of use.

The 1,4-α-polyglucans preferably employed have molecular weights $M_w$ in the range from $1\times10^3$ to $5\times10^4$ and, very particularly preferably, from $1\times10^4$ to $5\times10^4$.

The melt-processable polymeric material which is employed as component (B) and differs from component (A) is an optional component.

This is preferably an essentially biodegradable polymeric material which can be present in the mixture in amounts of up to 400 parts by weight based on component A. Mixtures of two or more such compounds are also suitable as component (B).

In the case where the thermoplastic mixture is to be used to produce food packaging etc., a physiologically tolerated polymeric material will preferably be chosen as component (B).

It is possible to use as component (B) in particular also one or more starches, one or more of their derivatives or mixtures of starches and starch derivatives. Possibilities in this connection are native, chemically modified, fermentative or recombinant starch and/or derivatives of said starches.

An important group of starches comprises the starches obtained from vegetable raw materials. These include, inter alia, starches from tubers, such as potatoes, cassava, maranta, sweet potato, from seeds such as wheat, corn, rye, rice, barley, millet, oats, sorghum, from fruits such as chestnuts, acorns, beans, peas and other legumes, bananas, and from plant piths, for example of the sago palm.

The starches which can be used for the purpose of the invention consist essentially of amylose and amylopectin in varying ratios of amounts.

Particularly good results are obtained inter alia with starches from potatoes (for example Toffena supplied by S üdstärke) and corn (for example maize starch supplied by National Starch).

The molecular weights of the starches which can be used according to the invention may vary over a wide range.

Examples of starches which can be employed for the thermoplastic mixture according to the invention are those consisting essentially of a mixture of amylose and amylopectin, preferably with molecular weights $M_w$ in the range between $5 \times 10^4$ and $1 \times 10^7$. Particularly preferred are long-chain polymers with molecular weights $M_w$ between $1 \times 10^6$ and $5 \times 10^6$.

Besides starches of native vegetable origin, it is also possible to use starches which are chemically modified, have been obtained by fermentation or are of recombinant origin.

The invention means by "chemically modified starches" those starches whose properties have been modified, compared with the natural properties, by chemical means. This is essentially achieved by reactions on the polymers, in which starch is treated with mono-, bi- or polyfunctional reagents or oxidizing agents. This preferably entails the hydroxyl groups of the polyglucans of the starch being converted by etherification, esterification or selective oxidation. Another possibility consists of graft copolymerization, initiated by free radicals, of copolymerizable unsaturated monomers onto the starch backbone.

Particular chemically modified starches include, inter alia, starch esters such as xanthates, acetates, phosphates, sulfates, nitrates, starch ethers such as, for example, nonionic, anionic or cationic starch ethers, oxidized starches such as, for example, dialdehyde starch, carboxy starch, persulfate-degraded starches and similar substances. Starches which have been modified with anionic groups or cationic groups or else nonionic groups.

"Fermentative starches" are in the terminology of the invention starches which are obtained by fermentation processes using naturally occurring organisms such as fungi, algae or bacteria or can be obtained with the inclusion and assistance of fermentation processes. Examples of starches from fermentation processes comprise, inter alia, gum arabic and related polysaccharides (gellan gum, ghatti gum, karaya gum, gum tragacanth), xanthan, emulsan, rhamsan, wellan, schizophyllan, polygalacturonates, laminarin, amylose, amylopectin and pectins.

"Starches of recombinant origin" or "recombinant starches" means specifically starches which are obtained by fermentation processes using organisms which do not occur in nature but are natural organisms modified with the assistance of genetic manipulation methods, such as fungi, algae or bacteria, or can be obtained with the inclusion and assistance of fermentation processes. Examples of starches from genetically modified fermentation processes are, inter alia, amylose, amylopectin and other polyglucans.

Finally, advantageous thermoplastic mixtures can also be obtained using derivatives of the individual starches mentioned. In this connection, the terms "derivatives of starches" or "starch derivatives" very generally mean modified starches, i.e. starches whose properties have been altered by changing the natural amylose/amylopectin ratio or carrying out a pregelatinization, a partial hydrolytic degradation or a chemical derivatization.

Particularly favorable thermoplastic mixtures are also obtained when the starches employed as component (B) have a minimum content of other compounds which are not included among the saccharides (for example proteins, fats, oils), (for example in particular potato starch), and/or ionic starches are used.

Components (B) which can be employed successfully for the purpose of the invention also include proteins. Examples thereof are, inter alia, gelatin, vegetable proteins such as sunflower protein, soybean protein, wheat protein, cotton-seed protein, pea protein, peanut protein, rapeseed protein, plasma proteins, egg white, egg yolk and the like.

Favorable mixtures are also obtained with additions of zein, gluten (corn, potato), albumin, casein, creatine, collagen, elastin, fibrin and/or whey protein.

Also of interest as component B) are polysaccharides. Water-soluble polysaccharides are preferably employed, such as alginic acid and its salts, carrageenans, furcellaran, guar gum, agar—agar, gum arabic and related polysaccharides (ghatti gum, karaya gum, gum tragacanth), tamarind gum, xanthan gum, aralia gum, locust bean gum, arabinogalactan, pullulan, chitosan, dextrins, cellulose.

Additions of lentinan, laminarin, chitin, heparin, inulin, agarose, galactans, hyaluronic acid, dextrans, dextrins, poly-$\epsilon$-caprolactone and/or glycogen may also have beneficial effects.

The thermoplastic mixture according to the invention is corrected to a water content of zero percent by calculation in relation to components (A) and (B). This means that the water content of components (A) and (B) is determined and subtracted appropriately in the apportionment of the parts by weight employed but is taken into account in the apportionment of component (C).

Componente (C), water, in the mixture according to the invention is an essential component.

The amount of water necessary for the plastification may vary within a wide range depending on the nature of the mixture employed.

If the amount of added water is too low, the destructuring and homogenization of the mixture is inadequate. If the water conent is too high, there is a risk that the viscosity of the mixture is too low. A sufficient amount of water in the mixture of the invention is generally from 1 part by weight up to three quarters, in particular up to one half, of the total of the parts by weight of (A) and (B). Preferred water contents are approximately between 5 and ((A)+(B))/1.3 parts by weight, and particularly preferred water contents are between 10 and ((A)+(B))/1.3 parts by weight.

In these preferred ranges there is optimal plastification of the mixture, i.e. destructuring of the starch, homogenization of the mixture and thermoplastification thereof.

The amount of water (C) comprises not only the water actually added but also the water contents of other components which are to be taken into account in the calculation, in particular the amount of water bound or present in components (A) and (B).

The nature of component (C) is essentially not otherwise critical. It is possible to employ demineralized water, deionized water or else, just as well, tap water or water of other origins as long as the content of salts or other foreign substances in the water is tolerable in relation to the intended use.

The presence of component (D) in the mixture according to the invention is essential.

One or more plasticizers are present in the composition of the invention in an amount in the range from 10 parts by weight up to half the total of the parts by weigh of (A) and (B). If the content of plasticizing compounds is below 10 parts by weight, the plastification is insufficient, even with relatively high mechanical and/or thermal energies. If the plasticizer content exceeds an amount corresponding to half the total of the parts by weight of (A) and (B), the plastification of the mixture is observed to be negligibly better.

Favorable amounts of plasticizer are in the range from 12.5 to ((A)+(B))/2 parts by weight, and particularly preferred plasticizer contents are in the range from 15 to $((A)+(B))/4$ parts by weight.

The optimal plasticizer content in each case depends on the other components and should expediently be determined separately for each formulation.

It is possible to employ all inert, preferably organic, substances which have in general a low vapor pressure and which, without a chemical reaction, physically interact, preferably by their dissolving and swelling capacity, but even without any such capacity with components (A) and, where appropriate, (B) and form a homogeneous system with the latter.

Component (D) to be employed according to the invention preferably confers on the mixture a reduced glass transition temperature, increased shape-changing capacity, increased elastic properties, reduced hardness and, where appropriate, enhanced adhesion.

Preferred plasticizers according to the invention are odorless, colorless, resistant to light, cold and heat, have little or no hygroscopicity, are resistant to water, not hazardous to health, of low flammability and minimal volatility, have a neutral reaction, are miscible with polymers and auxiliaries and show good solvating behavior. In particular, they should show compatibility, solvating power and plasticizing activity in relation to components (A) and, where appropriate, (B).

In addition, the compounds to be employed according to the invention as component (D) should show little migration, which is important in particular for applications of the moldings according to the invention in the food sector.

Particularly preferred plasticizing components D) include, inter alia, dimethyl sulfoxide, 1,3-butanediol, glycerol, ethylene glycol, propylene glycol, diglyceride, diglycol ether, formamide, N,N-dimethylformamide, N-methylformamide, dimethylacetamide, N-methylacetamide and/or N,N'-dimethylurea.

Also particularly advantageous are polyalkylene oxides, glycerol mono-, di- or triacetate, sorbitol, or other sugar alcohols such as erythritol, saccharic acids, saccharides such as glucose, fructose or sucrose, and citric acid and its derivatives.

Component (E) of the mixture according to the invention is optional. It may comprise one or more substances which can be employed in total as component (E) in amounts of up to $((A)+(B))$ parts by weight, preferably not more than $((A)+(B))/2$ parts by weight.

Conventional additives include, inter alia, fillers, lubricants which are different from the plasticizers mentioned under (D), flexibilizers, pigments, dyes, mold release agents and others.

Examples of suitable fillers are synthetic polymers which are almost soluble in the mixture, such as, for example, polymers based on lactic acid, such as ®Lacea supplied by Mitsui, ®Resomer supplied by Boehringer Ingelheim, and other polymers based on lactic acid and related polymers of lactic acid supplied by Wako Pure Chemical Industries Ltd., Medisorb Co., Birmingham Polymers, Inc., Polysciences Inc., Purac Biochem BV, ethicon, cargill or chronopol, it being evident that this list cannot correspond to absolute completeness, or blends of synthetic polymers with natural polymers, for example Mater-Bi supplied by Novamont.

It is further proposed to add at least inorganic filler such as, for example, magnesium oxide, aluminum oxide, $SiO_2$, $TiO_2$ etc.

Suitable for coloring the mixture are, in particular, organic or inorganic pigments, but especially pearlescent pigments which are based predominantly on silicate structures and are therefore biocompatible, that is to say are to be categorized as harmless for living organisms and, in principle, as edible, and can be employed in amounts between 0.001 and 10 parts by weight.

Particularly suitable for improving the flow properties are animal or vegetable fats and/or lecithins, which are preferably used in hydrogenated form, these fats and other fatty acid derivatives preferably having a melting point above 50° C.

In order to increase the resistance of the melt-processable mixture to water during and after the processing, it is possible to add to the mixture a crosslinker in minor amounts in order to modify the starch chemically. Preferably employed for this purpose are alkylsiloxanes in amounts of up to 5 parts by weight.

Suitable crosslinkers include, inter alia, dibasic or polybasic carboxylic acids and their anhydrides, acid halides of dibasic or polybasic carboxylic acids, amides of dibasic or polybasic carboxylic acids, derivatives of dibasic or polybasic inorganic acids, dialdehydes, especially glyoxal and glutaraldehyde, epoxides, diepoxides, ethylene glycol diglycidyl ether, formaldehyde and/or urea derivatives, divinyl sulfones, diisocyanates, isocyanates, oxo compounds and cyanamide, these compounds also being particularly suitable for chemical modification following the melt-processing and thus being able to contribute to further improving in particular the mechanical properties.

The parts by weight stated for the individual components (E) may vary depending on requirements.

In another embodiment, a phosphate is added to the thermoplastic composition according to the invention. Molded parts obtained from such compositions are distinguished by excellent mechanical properties. In addition, the flame resistance and temperature resistance of the molded parts can be improved.

The phosphates are generally added in an amount of 0.01 parts by weight to $((A)+(B))/10$ parts by weight, in particular 0.1 parts by weight to $((A)+(B))/20$ parts by weight.

The term "phosphates" means for the purpose of the invention salts and esters of the various phosphoric acids. However, the salts of the various phosphoric acids are much preferred for the invention. It is also possible according to the invention to add mixtures of one or more salts and/or esters of the various phosphoric acids.

Examples of suitable phosphates are, inter alia, orthophosphates of the formulae $M^I H_2 PO_4$ (for example $NaH_2PO_4$) and $M^{II}(H_2PO_4)_2$ [for example $Ca(H_2PO_4)_2$], secondary orthophosphates of the formulae $M^I_2 HPO_4$ or $M^{II}HPO_4$ (for example $K_2HPO_4$, $CaHPO_4$) or tertiary orthophosphates of the formulae $M^I_3 PO_4$ or $M^{II}_3(PO_4)_2$ [for example $Na_3PO_4$, $Ca_3(PO_4)_2$], where $M^I$ is a singly charged cation such as, for example, $^+NRR'R''R'''$, in which R, R', R" and R'" are, independently of one another, identically or differently hydrogen, $(C_1–C_8)$-alkyl, linear or branched, $(C_4–C_8)$-aryl, preferably phenyl, alkali metal ion, preferably $Na^+$ or $K^+$, and $M^{II}$ is a doubly charged cation, preferably alkaline earth metal ion, particularly preferably $Ca^{2+}$.

Also of particular interest is the group of condensed phosphates which is derived from the acidic salts of orthophosphoric acid and is produced by loss of water on heating which can in turn be divided into metaphosphates (systematic name:cyclo-polyphosphates) and polyphosphates (systematic name: catena-polyphosphates).

Preferred representatives include, inter alia, Graham's salt, Kurrol's salt and Maddrell's salt, and fused or calcined phosphates.

Particularly expedient are, inter alia, metaphosphates of the formula $M'_n[P_nO_{3n}]$, in which $M'$ is a singly charged cation, preferably metal ion, expediently alkali metal ion, preferably Na$^+$ or K$^+$, or $^+$NRR'R"R''', in which R, R', R" and R''' are, independently of one another, identically or differently hydrogen, ($C_1$–$C_8$)-alkyl, linear or branched, ($C_4$–$C_8$)-aryl, preferably phenyl, and n is a whole natural positive number, preferably in the range between 3 and 10. Of these in turn preference is given to those metaphosphates in which n is 3, 4 or 5 and $M'$ is sodium or potassium, Sodium trimetaphosphate, sodium tetrametaphosphate and sodium pentametaphosphate are most preferred.

Advantageous mixtures are also obtained with polyphosphates of the formula $M'_{n+2}[P_nO_{3n+1}]$ or $M'_n[H_{2n}P_nO_{3n+1}]$, in which $M'$ is a singly charged cation, preferably metal ion, expediently alkali metal ion, preferably Na$^+$ or K$^+$, or $^+$NRR'R"R''', in which R, R', R" and R''' are, independently of one another, identically or differently hydrogen, ($C_1$–$C_8$)-alkyl, linear or branched, ($C_4$–$C_8$)-aryl, preferably phenyl, and n is a whole natural positive number greater than 2. Of these, preference is given to sodium and potassium polyphosphates in which n is >10.

It is also possible to obtain mixtures with beneficial properties if polyphosphates of the formula $M'_{n+2}[P_nO_{3n+1}]$, in which $M'$ is a singly charged cation, preferably metal ion, expediently alkali metal ion, preferably Na$^+$ or K$^+$, or $^+$NRR'R"R''', in which R, R', R" and R''' are, independently of one another, identically or differently hydrogen, ($C_1$–$C_8$)-alkyl, linear or branched, ($C_4$–$C_8$)-aryl, preferably phenyl, and n is a whole natural positive number in the range between 3 and 10, are employed. Pentasodium tripolyphosphate is preferred amongst these inter alia.

The thermoplastic mixture according to the invention is further distinguished in a particular embodiment by the phosphate being an alkali metal salt of a metaphosphate or polyphosphate.

Another favorable modification of the thermoplastic mixture according to the invention results on addition of sodium trimetaphosphate, sodium metaphosphate, sodium polyphosphate and/or sodium hexametaphosphate, preferably sodium polyphosphate, as phosphate.

Said phosphates may vary in the degree of hydration. Because of the relatively small amounts of the phosphate component in the thermoplastic mixture, this water content can usually be ignored when determining the parts by weight of phosphate component and is not harmful because component (C) is essential.

Components (A) to (E) of the mixture according to the invention are mixed, where appropriate with introduction of thermal and/or mechanical energy, and processed with introduction of thermal and/or mechanical energy to a thermoplastic mixture.

Introduction of the mechanical and thermal energy preferably takes place simultaneously, for examle by operating at elevated temperature and, at the same time, exerting shear forces on the starch-based thermoplastic mixture to be plasticized.

It is generally true that the homogeneity of the mixtures resulting at higher temperatures is better. However, the temperatures should not be too high in order to avoid unnecessary discoloration or decomposition of the molding compositions.

In this connection, the thermoplastic mixture of the invention can be obtained in a preferred modification by mixing at temperatures in the range from >60° C. to 220° C., preferably 80° C. to 180° C. and particularly preferably 100° C. to 160° C.

In principle, the homogenization of the mixture increases with the energy input. This means that the homogenization of the thermoplastic starch mixture is improved with a higher energy input into the mixing unit.

However, care must be taken that the mechanical energy introduced via the mixing unit is not converted into thermal energy to too great an extent, which may lead to an unwanted increase in temperature. Suitable cooling thermostats can be employed for prevention.

Another modification of the invention provides for a thermoplastic mixture obtainable by mixing with use of high-shear mixing units, in which case the energy introduced into the mixture can be derived in particular from the energy of the processing machines used. Thus, it is possible in particular to process using equipment whose plastification element is provided with torques which are in the range from 5 to 300 Nm (1 newton meter). Processing with a torque in the range from 10 to 100 Nm has proven advantageous. Processing with a torque in the range from 20 to 40 Nm is preferred.

A particularly favorable uptake of thermal and/or mechanical energy by the mixture is achieved when the components of the mixture according to the invention are mixed and homogenized in a plastics processing machine such as, for example, an extruder, kneader or similar units.

The process can preferably be carried out in single or twin screw extruders. These are preferably composed of individual housings which have temperature-controllable jackets. The design of the screws is subject to no restriction, and transporting elements with or without shear edges, kneading elements and/or mixing elements can be present. It is additionally possible and frequently advantageous to use baffle or feedback elements at least in part, i.e. in sections, in the extruder in order to influence and to control the residence time and mixing properties.

In general the sequence of admixture of ingredients (A) to (F) has no particular effect on the properties of the resulting thermoplastic mixture. If, however, a phosphate component is added together with a starch component (B), it has proven to be advantageous to carry out at least the mixing of the phosphate component with components (A) and (B) with use of thermal and mechanical energy.

This procedure differs distinctly in its nature and effect from the prior art. When phosphoric acids or their salts or esters were used hitherto as modifying agents in the preparation of starch-based thermoplastic mixtures, there was exclusive and always direct modification of the starch grain. In other words, the modification took place before disruption or destructuring of the grain as a consequence of the plastification.

In contrast to this, the described procedure ensures that it is possible to modify not just the surface of the starch grain but all the molecules of the starch, preferably on the starch backbone. This leads to products with advantageous properties.

It is assumed that it is possible by adding the phosphate component during the processing in the homogenizing or mixing unit, such as, for example, in the kneader or extruder, to prevent very substantially the reaction under alkaline to acidic conditions with starch, starch derivatives or else admixed proteins, so that the reaction is equivalent to a crosslinking to only a minor extent. This means that modification of the polymer backbone predominates. It is also possible, with suitable control of the reaction, to achieve through addition of plasticizers, which per se have a high ratio of hydroxyl groups or other hydrogen bonding groups to carbon atoms, coupling of the plasticizer to the starch backbone via reaction of the phosphate. This eventually results—especially during the processing—in a reduction in migration of the plasticizer out of the mixture and, at the same time, does not, however, preclude the plasticizing effect of the plasticizer, through which the destructuring of the starch (disruption of the starch grain) thus becomes possible. This possibility for interpreting the reactions taking place and leading to the results which were surprisingly found does not, however, rule out other possible interpretations.

The thermoplastic molding composition according to the invention can be processed to products by known processing procedures. It can thus, for example, be granulated or pelletized in a first step.

The invention thus also relates to granules obtainable by extrusion and pelletization from the thermoplastic mixture according to the invention.

It is additionally possible to obtain, either directly or by renewed melt processing of the thermoplastic granules, readily biodegradable molded parts or sheets with improved mechanical properties.

Finally, the invention also includes, in particular, the use of thermoplastic mixtures for producing molded parts or sheets.

Thus, overall, the products according to the invention cover a large number of possible applications. These include, inter alia, specifically adhesives for paper and corrugated board, moldings produced by injection molding, especially rods, pipes, bottles, capsules, granules, food additives, films, as coatings or separate films, also as laminates, especially sheets, packaging materials, bags, release-slowing materials for controlled release of active ingredients in general, especially drugs, pesticides or other active ingredients employed in agriculture, fertilizers, flavorings etc. It is moreover possible for the active substance to be released from films, sheets, tablets, particles, microparticles, rods or other extrudates or other moldings.

The products obtained from the thermoplastic mixture according to the invention, such as moldings or sheets, are essentially biocompatible and, where appropriate, edible, which smooth the way to edible packagings, that is to say, in particular, food packagings.

Food packagings in this connection mean both secondary packagings which have only temporary contact with the food, and packagings such as tubings, casings or coatings whose inner surface is in continuous contact with the food and may therefore also be consumed on consumption of the foodstuff. The packagings are therefore suitable inter alia for fruit, eggs, cheese, confectionery products, cakes, cookies or effervescent tablets, beverages, meat, sausage products and roast meat.

Use of the moldings obtainable from the thermoplastic molding compositions according to the invention is moreover not restricted to use in combination with temporary products but can also be applied to the temporary employment for protecting consumer articles and capital goods during transport or storage. Particularly conceivable in this connection is protection from climatic effects as occur, for example, during transport of automobiles overseas.

Further preferred applications comprise absorbents, dusting powders and the like.

In a particular embodiment, the thermoplastic mixtures according to the invention are used to produce moldings for controlled release of active ingredients, such as, for example, tablets or coated tablets.

Another expedient and particularly favorable use of the thermoplastic mixture according to the invention relates to the production of moldings which are suitable for producing solid moldings, blowmoldings or combinations thereof.

Another outstanding use of the thermoplastic mixture according to the invention is in the production of sheets for use in agriculture.

In another particular modification, the invention provides for the use of the thermoplastic mixture for producing sheets for use for food applications.

A specific use according to the invention of the thermoplastic mixture is for producing sheets for use in secondary food packaging.

A further preferred favorable use of the thermoplastic mixture according to the invention involves the production of sheets for use as food packaging with full-area contact with the food.

Finally, a particularly advantageous use of the thermoplastic mixture according to the invention is the production of flat or tubular sheets for use as food casings for sausage and cheese.

For special adaptation to the particular purpose of use, it is possible to add suitable materials if required to the thermoplastic mixture according to the invention or to the granules obtained therefrom during production of the moldings.

Materials of this type are known per se. Examples thereof are fibers, crosslinkers, proteins, water repellents, lubricants, synthetic plastics etc.

The quantity data are based on the weight of the starch employed, i.e. weight of component (A) and, where appropriate, (B). However, these data may vary depending on requirements.

For example, it is possible to admix, in order to increase the mechanical strength, fibers in an amount of 5–70% by weight, preferably 20–45% by weight, such as cotton fibers, hemp fibers, cellulose etc.

Crosslinkers which can be used are the same as described above in connection with the plastification. Preferred examples are dicarboxylic acids, dialdehydes, especially glyoxal and glutaraldehyde, diisocyanates and diepoxides, for example ethylene glycol diglycidyl ether or else polyphosphates.

The crosslinkers contribute to improving the resistance to water. They are generally used in an amount of 0.1 to 10% by weight, preferably 0.5–3% by weight.

It is also possible to add proteins such as, for example, those described above, in particular casein, gelatin, soybean, wheat and pea proteins. The amount added is generally 2–40% by weight, preferably 3–10% by weight.

Further additives which may be mentioned are conventional water repellents and/or lubricants, which are generally employed in an amount of 2–12% by weight, preferably 3–6% by weight.

It is possible by adding, for example, lubricants to improve the peelability of food packagings, for example sausage casings. They also have a beneficial effect on the resistance to water.

Plasticizers like those described above, for example glycerol or citric acid, can be added in conventional amounts, for example 5–40% by weight, preferably 5–20% by weight.

It is possible by adding plasticizers to increase, for example, the suppleness of packagings, in particular, for example, for sausage casings.

Further possible and suitable additives are synthetic polymers. Suitable examples are flexible and tough polyamides, polyesters, polyolefins, ethylene/acrylic ester/maleic anhydride copolymers or polyvinylpyrrolidone.

Preferred polyolefins are low density polyethylene or polypropylene. The content of sythetic polymers is expediently 5–50% by weight, preferably 10–40% by weight.

The moldings obtained from the thermoplastic mixture according to the invention can be processed or combined using procedures known for moldings or sheets produced from biopolymers. For example, it is possible to apply the impregnations or coatings known for cellulose hydrate casings to the moldings or sheets obtained according to the invention. This particularly relates also to the use as food casings.

The following examples illustrate the subject-matter of the invention.

EXAMPLES

Example 1

In vitro production of glucans using partially purified amylosucrase.

For an expression of an extracellular amylosucrase activity, *E. coli* cells were transformed by standard methods with the vector pNB2. YT medium (100 µg/ml ampicillin) was inoculated with a colony of the transformed strain. The cells were incubated at 37° C. with continuous agitation (rotating agitator; 150–200 rpm) overnight. The cells were then spun down (30 min, 4° C., 5500 rpm, JA10 Beckmann rotor). The supernatant was sterilized by filtration through a 0.2 µm filter (Schleicher&Schuell). The supernatant was then concentrated 200-fold using an Amicon chamber (YM30 membrane with an exclusion size of 30 kDa, supplied by Amicon) under pressure (p=3 bar). This concentrated supernatant was added to 50 ml of sucrose solution (5% sucrose in 50 mM sodium citrate buffer pH 6.5). The complete mixture was incubated at 37° C. White insoluble polysaccharides are formed.

Example 2

Scale up of the in vitro production of 1,4-α-D-polyglucan.

10 l of a 20% strength sucrose solution are placed in a 15 l vessel which has been sterilized by a conventional method (in this case: steam sterilization). The enzyme extract containing amylosucrase is added in one portion. The enzyme activity in this experiment was 14.5 units determined by the method described in Example 3. The apparatus is provided with a likewise sterilized glass shaft/bearing stirrer. The vessel is closed and incubated at 37° C. White particles and flakes are formed after a time of only a few hours. The reaction is stopped after a time of 216 hours. The precipitate is filtered off and washed twice with water in order to remove the low molecular weight sugars and unreacted sucrose from the 1,4-α-D-polyglucan. It is then washed a further five times. The aqueous washings are collected and evaporated to dryness in a rotary evaporator. 90 g (yield 5% based on sucrose employed) of solid remain and correspond to oligomeric 1,4-α-D-polyglucan portions. The residue remaining on the filter is dried in a drying oven at 40° C. with application of a vacuum. The weight is 786 g. This corresponds to a yield of 39% of 1,4-α-D-polyglucan. The residue is dried as described. The 1,4-α-D-polyglucans obtained in this way can be employed directly for analytical investigations and for producing blends.

Example 3

Detection of the amylosucrase activity in the culture supernatants of transformed *E. coli* cells cultivated in the absence of sucrose For an expression of an extracellular amylosucrase activity, *E. coli* cells were transformed by standard methods with the vector pNB2. YT medium (100 µg/ml ampicillin) was inoculated with a colony of the transformed strain. The cells were incubated at 37° C. with continuous agitation (rotating agitator; 150–200 rpm) overnight. The cells were then spun down (30 min, 4° C., 5500 rpm, JA10 Beckmann rotor). The supernatant was sterilized by filtration through a 0.2 µm filter (Schleicher&Schuell).

Amylosucrase activity was detected 1) by incubating the supernatant on a sucrose-containing agar plate. For this purpose, 40 µl of the supernatant were placed in a hole punched out of an agar plate (5% sucrose in 50 mM sodium citrate buffer at pH 6.5) and incubated at 37° C. for at least one hour. Detection of the products of the reaction catalyzed by amylosucrase took place by staining by exposure to iodine vapor. Reaction products which are present cause a blue coloration;

2) or by fractionation of the proteins of the supernatant by gel electrophoresis in a native gel and detection of the reaction products in the gel after incubation with sucrose. For this purpose, 40–80 µl of the supernatant were fractionated by gel electrophoresis on an 8% native polyacrylamide gel (0.375 M tris at pH 8.8) at a voltage of 100 V. The gel was then equilibrated twice for 15 min with about 100 ml of 50 mM sodium citrate buffer (pH 6.5), and incubated in sodium citrate buffer pH 6.5/5% sucrose at 37° C. overnight. To visualize the reaction products from the reaction catalyzed by amylosucrase, the gel was swirled in Lugol's solution. Bands with amylosucrase activity show an intense blue coloration.

Example 4

Characterization of the reaction product synthesized by amylosucrase from Example 1

The insoluble reaction products described in Example 3 are soluble in 1 M NaOH. The reaction products were characterized by measuring the absorption maximum. For this purpose, about 100 mg of the isolated reaction products (wet weight) were dissolved in 200 µl of 1 M NaOH and diluted 1:10 with $H_2O$. 900 µl of 0.1 M NaOH and 1 ml of Lugol's solution were added to 100 µl of this dilution. The absorption spectrum between 400 and 700 nm was measured. The maximum is at 605 nm (absorption maximum of amylose: about 614 nm). HPLC analysis of the reaction mixture from Example 3 on a CARBIOPAC PA 1 column (DIONEX) showed formation not only of insoluble products but also of soluble products. These are short-chain polysaccharides. The chain length in this case was between about 5 and about 50 glucose units. However, shorter and longer molecules were also detectable to a small extent. It was not possible with the analytical methods available to detect branches in the synthesized products.

Example 5

Characterization of the water-insoluble reaction products synthesized by amylosucrase from Example 2

2 mg of the polyglucan from Example 2 are dissolved in dimethyl sulfoxide (DMSO) at room temperature. The solution is filtered through a 2 µm filter and injected into a gel permeation chromatography column. DMSO is used as eluent. The signal intensity is measured using an RI detector and is evaluated by comparison with a pullulan standard (supplied by Polymer Standard Systems). The flow rate is 1.0 ml per minute. The measurement shows a number average of 8,900 dalton and a weight average of 24,000 dalton. This corresponds to a polydispersity of 2.7.

Example 6

Characterization of the water-soluble reaction products synthesized by amylosucrase from Example 2

Characterization of the water-soluble components of the 1,4-α-D-polyglucan prepared in a biocatalytic reaction using amylosucrase takes place by means of matrix-assisted laser desorption/ionization mass spectroscopy (MALDI-MS). The instrument used is a Bruker Reflex II™ time-of-flight (TOF). The instrument operates with an LSI nitrogen laser which provides pulses lasting 3 ns with an energy of about 250 µJ at a wavelength of 337 nm. The laser beam is focussed on a sample with dimensions 50 µm×100 µm. The resulting energy is thus about 10 MW cm$^{-2}$. The desorbed ions are accelerated to an energy of 35 keV. The sample is measured in reflectron mode which allows oligomeric components to be determined. The sample is prepared in the following way. 10 µl of a 10$^{-4}$ molar solution of the polymer in tetrahydrofuran (THF) is added to 10 µl of a 0.1 molar solution of the matrix 1,8,9-trihydroxyanthracene (supplied by Aldrich) in tetrahydrofuran. 1 µl of a solution of 5 g of the ionizing agent silver trifluoracetate (supplied by Aldrich) in 1 l of THF is added. 1 µl of the final solution is placed on the target of the mass spectrometer and dried as quickly as possible by introducing a stream of air. The mass spectra are determined as average over a total of 200 laser pulses. It is possible to use as internal standard lower and oligomeric sugars. Those used in the case of 1,4-α-D-polyglucan are glucose, D-(+)-maltose monohydrate, maltotriose, maltotetraose, maltopentaose and maltohexose (supplied by Fluka). The measurement shows a peak distribution ranging up to 4000 m/z (mass over charge). There are maxima both in the low molecular weight region (monomer, dimer) and around 1500 m/z. The repeating unit, which is obtained from the distance between two adjacent peaks, is 162 g/mol. High resolution in the low molecular weight region shows the most intense peak at 203 g/mol. The subtraction of a monomer unit leaves a remainder of 41 g/mol. Since a hydrogen atom and a hydroxyl group occur as end groups in 1,4-α-D-polyglucan, the remainder of 23 g/mol (41 g/mol–18 g/mol for water) is attributable to ubiquitous sodium. Accordingly, the buffer used in the biotransformation (sodium citrate) is enriched by the washing procedure in the fraction of water-soluble polymer contents. Evaluation of the data with the existing uncertainty due to the low molecular weight portions present shows a value of about 1800 g/mol for $M_n$ and of 2400 for $M_w$.

Example 7

Preparation of a melt-processable blend of 1,4-α-D-polyglucan and poly-ε-caprolactone A commercially available kneading unit (Brabender kneader) is used. The kneading unit is heated to 100° C. 20 g of 1,4-α-D-polyglucan are added to the kneading unit in the operating state. Then 20 g of water are added and homogenized with the introduced polymer. After about 5 minutes, 20 g of poly-ε-caprolactone (commercially available Tone P 787 polymer supplied by Union Carbide Corporation) are added, and the composition is kneaded until homogeneous. This is the case after about 20 minutes. The composition is removed while the instrument is still in the heated state. The product is white and nontransparent. After cooling, the thermoplastic composition can be further processed to granules, for example.

Example 8

Preparation of a melt-processable blend of 1,4-α-D-polyglucan and xanthan

The experiment is carried out as described in Example 7. The mixture consists of 27 g of 1,4-α-D-polyglucan, 15 g of water, 15 g of glycerol and 3 g of xanthan (gum xanthan supplied by Aldrich). Removal takes place as described in Example 7. The composition is pale beige in color. The product can be employed directly for further processing.

Example 9

Preparation of a melt-processable blend of 1,4-α-D-polyglucan and polyvinyl alcohol The experiment is carried out as described in Example 7. The mixture consists of 30 g of 1,4-α-D-polyglucan, 12 g of water and 15 g of polyvinyl alcohol (Mowiol 26-88 supplied by Hoechst AG). Removal takes place as described in Example 7. The composition is white and nontransparent. The product can be employed directly for further processing. Since these mixtures can serve as nutrient media for fungi etc., it has additionally proven appropriate to add sorbic acid to a small extent (about 2%) to the mixture during the kneading process.

Example 10

Preparation of a melt-processable blend of 1,4-α-D-polyglucan and carrageenan

The experiment is carried out as described in Example 7. The mixture consists of 27 g of 1,4-α-D-polyglucan, 15 g of water, 15 g of glycerol and 3 g of carrageen (supplied by Sigma). Removal takes place as described in Example 7. The composition has a gray color and is tacky. The product can be employed directly for further processing.

Example 11

Preparation of a melt-processable blend of 1,4-α-D-polyglucan and gelatin

The compounds are prepared in a kneading unit as in Example 7. The kneading unit is heated to 100° C. 6 g of gelatin (type 11 supplied by Sigma) are added when the kneading unit is in the operating state. Then 6 g of water are added and homogenized with the introduced polymer. After about 5 minutes, 18 g of 1,4-α-D-polyglucan are added. The kneading time to homogeneity is 10 minutes. The mixture has a pale brown color owing to the gelatin. The mixture is removed while the equipment is still in the heated state. After cooling, the hard composition can be passed on for further investigations (for example resistance to water).

Example 12

Production of a sheet by a pressing technique from the thermoplastic 1,4-α-D-polyglucan mixture prepared in Example 7

The composition described in Example 7 is processed to a sheet by a pressing technique. A commercially available press supplied by Schwabenthan (Polystat 300 S) is used for this. The press is preheated to 100° C. Sample preparation takes place in a sandwich technique between two fabric-reinforced sheets of polytetrafluorethylene (Teflon™) which are held apart by a metal frame about 100 µm thick. About 2 g of the compostion prepared in the kneader are placed in the middle of the lower sheet for the preparation. The sample is kept at 100° C. under a pressure of 1 t for 5 minutes. The sample is then pressed under a pressure of 10 t at 100° C. for 5 minutes. Because of the geometry of the press used, this corresponds to a pressure of 200 bar. The press is released and the sample is transferred into another press for cooling. The latter comprises a water-cooled press supplied by Robert Fuchs Hydraulische Maschinen und Werkzeuge. A pressure of 50 bar is applied during the cooling process which takes 2 minutes. The sample can subsequently be removed in order to employ it for further investigations.

Example 13

Preparation of a melt-processable blend of 1,4-α-D-polyglucan and another starch The experiment is carried out as described in Example 7. The mixture consists of 27 g of 1,4-α-D-polyglucan, 15 g of water, 15 g of glycerol and 3 g of corn starch (National Starch). Removal takes place as described in Example 7. The product can be employed directly for further processing.

Example 14

Preparation of a melt-processable blend of 1,4-α-D-polyglucan and compostible biodegradable compounds The experiment is carried out as described in Example 7. The mixture consists of 27 g of 1,4-α-D-polyglucan, 15 g of water, 15 g of glycerol and 10 g of Mater-Bi (supplied by Novamont) type ZF02U. Removal takes place as described in Example 7. The composition has a pale beige color. The product can be employed directly for further processing.

Example 15

Preparation of a mixture of 1,4-α-D-polyglucan and additives for further processing using a twin screw extruder 1 kg of potato starch (potato flour for example of the brand Toffena™ supplied by Südstaarke) and 0.25 kg of 1,4-α-D-polyglucan are mixed together and homogenized manually. (Use of a mixer (for example a normal kitchen appliance is sufficient for the amounts described) is suitable if the particle sizes of the polymers used differ greatly from one another.) A mixture of 300 g of glycerol and 1 g of glyoxal (40% strength aqueous solution) is then slowly added. During this, the mixture is kneaded manually. After the addition is complete and at the start of the kneading process, the composition is very tacky and relatively large agglomerates form. During the homogenization the composition becomes increasingly dry and fine-grained, which is attributable to the absorption of the polar additives by the starch and amylose. The mixture prepared in this way can be used directly for further processing in an extruder.

The natural water content of the starch is sufficient for the plastification.

Example 16

Production of extruded sheeets from 1,4-α-D-polyglucan with potato starch, plasticizer and crosslinking using a twin screw extruder This experiment is carried out with the polymer mixture prepared in Example 15. The experiment is carried out in a twin screw extruder (Haake Rheomex PTW 25/28p). The screws used are of the standard design of the conical variant. The extruder is provided with four heating elements which can be actuated variably. The processing temperature is 140° C. in all cases. The temperature profiles are recorded on line using commerically available software. The melt temperature at the die is on average ten degrees Celsius above the temperature of the heating elements. The speed of rotation is 25 revolutions per minute. The extrudate emerges through a so-called slit die with dimensions of 100 mm width and 0.2 mm height (height adjustable between 0.2 mm and 1.0 mm). The extruder is run with heavy overfeeding, i.e. substance is made available in adequate amount at the feed end. Permanent feeding is ensured by means of a plunger on top. Care must be taken that the rate of transport of substance is as constant as possible. The plunger consists of heavy duty plastic (alternatively wood) in order to preclude the abrasion of metal from a corresponding tool.

After an initial period of about 10 minutes, the extrudate emerges from the die initially cloudy like milk and beige-colored. The extruded film is initially very flexible. After a short time, the film solidifies in the air. It is transported further by a downstream conveyor belt. If flaws are present the extruded ribbon may break. The extruded film is elastic in the warm state but this property declines perceptibly with the cooling process. The samples obtained in this way can be subjected to further analysis, for example determination of the resistance to water, mechanical properties, without further treatment (cleaning or surface finishing).

Example 17

Production of extruded sheets from 1,4-α-D-polyglucan with potato starch and plasticizer using a twin screw extruder The experiment is carried out as described in Example 16. The mixture used was prepared in analogy to Example 15 and consists of 1 kg of potato starch (potato flour, for example, of the brand Toffena™ supplied by Südstärke), 0.5 kg of 1,4-α-D-polyglucan (amylose) and 500 g of glycerol.

The extruder is run underfed, i.e. the mixture is metered at a slow constant rate from a twin screw feed (suitable for powders and granules, supplied by Haake) at the feed end. The extruded product is a smooth transparent film. The film is slightly amber-colored and shows exceptional flexibility. After a distance of about 1 m on the conveyor belt and the associated air cooling, the film is wound up on an appropriate additional apparatus (take-off roll with integrated winder, supplied by Haake). The wound-up film can be rolled out to a flat sheet without breaking. Further investigation can be carried out directly on this material.

Example 18

Production of an extruded cylindrical strand of 1,4-α-D-polyglucan with pea starch and a mixture of plasticizers and crosslinkers The mixture used in this experiment is prepared in a kneading unit. The volume of the kneader is about four liters. The kneading unit is preheated to 120° C. (steam heating). 0.8 kg of pea starch and 0.2 kg of 1,4-α-D-polyglucan are introduced, and 500 g of water are added in portions. The time until a homogeneous mixture is obtained is about 20 minutes. Then 500 g of glycerol are added in portions. The time until homogeneity is obtained is likewise about 20 minutes. Finally, 100 g of glyoxal (40% strength aqueous solution) are added all at once. The composition is kneaded for a further 5 to 10 minutes. The composition suddenly swells during this period. The composition is removed from the kneading unit and mechanically comminuted. The experiment is carried out as described in Example 16. However, as a difference, a round-sectioned die is interpolated in place of the slit die. This comprises a metal device which has a cylindrical orifice and is thus suitable for producing a continuous strand. The diameter of the orifice is 0.5 mm. The temperature at the feed end is 90° C. The other heating elements are operated at 140° C. as in Example 12. The extruder is operated with overfeeding. The strand which emerges after about 5 minutes from the conical die is amber-colored to dark brown. The surface is roughened and slightly cloudy. The transparency is evident at points where the strand has broken. The strand can be conditioned to a form suitable for further processing in a pelletizing line following the conveyor belt (air drying).

Example 19

Production of blown films from 1,4-α-D-polyglucan blends

A blend in the form of granules can be processed in an extrusion blowmolding system as follows. It is expedient for the system initially to be run in stationary with polypropylene (PP) and high density polyethylene (LDPE) and then to reduce the temperature stepwise to a maximum of 160° C. With the machine running, the 1,4-α-D-polyglucan mixture is fed in as granules (Example 7) or as powder (Example 15). This is achieved by a volumetric metering device. During this, a reactive additive such as, for example, a reagent for surface modification or for crosslinking (for example sodium polyphosphate, glyoxal etc.) is metered in, expediently in parallel, in order to avoid possible impairment of the thermoplasticity.

The fore-run, which still contains PP and LDPE, is discarded. The thermoplastic granules are processed by known processes ('double bubble' or 'injected bubble'). The stretching process is brought about by a cushion of compressed gas, preferably air, with the stretch ratio in the longitudinal and transverse directions being in the range from 2 to 4. The longitudinal stretching can be specifically influenced by the tension of the pair of take-off rolls. In order to improve the dimensional stability of the blown film, the extrusion step is followed by a heat setting section with hot air as heat transfer medium. The winding up of the biaxially stretched films is carried out with reciprocating winders.

What is claimed is:

1. A thermoplastic mixture based on biopolymers obtainable by preparing and mixing
   (A) 100 parts by weight of a biocatalytically produced 1,4-α-polyglucan,
   (B) up to 400 parts by weight of a melt-processable polymeric material different from (A),
   (C) water in an amount sufficient for plastification of the mixture,
   (D) at least one plasticizer in an amount of 10 parts by weight up to half the total of the parts by weight of (A) and (B), and
   (E) where appropriate up to ((A)+(B)) parts by weight of other conventional additives, where the water content of components (A) and (B) has been corrected to zero by calculation.

2. A thermoplastic mixture as claimed in claim 1, where the biocatalytically produced 1,4-α-polyglucan is obtained by biotransformation using a glycosyltransferase.

3. A thermoplastic mixture as claimed in claim 2, where the biocatalytically produced 1,4-α-polyglucan is obtained by biotransformation with amylosucrases.

4. A thermoplastic mixture as claimed in claim 2, where the biocatalytically produced 1,4-α-polyglucan is obtained by biotransformation with phosphorylases.

5. A thermoplastic mixture as claimed in claim 1, which is obtainable by mixing at temperatures in the range from >60° C. to 200° C.

6. A thermoplastic mixture as claimed in claim 1, which is obtainable by mixing with use of high-shear mixing units having plastification elements, it being possible to achieve torques in the range from 10 to 100 Nm, preferably 20 to 40 Nm, with the plastification elements.

7. A thermoplastic mixture as claimed in claim 1, where water is admixed in an amount of one part by weight up to three quarters of the total of the parts by weight of (A) and (B).

8. A process for preparing a thermoplastic mixture based on biopolymers, in which
   (A) 100 parts by weight of a biocatalytically produced 1,4-α-polyglucan,
   (B) up to 400 parts by weight of a melt-processable polymeric material different from (A),
   (C) water in an amount sufficient for plastification of the mixture,
   (D) at least one plasticizer in an amount of 10 parts by weight up to half the total of the parts by weight of (A) and (B), and
   (E) where appropriate up to ((A)+(B)) parts by weight of other conventional additives, where the water content of components (A) and (B) has been corrected to zero by calculation,
are prepared and mixed together and plasticized with introduction of thermal and mechanical energy, preferably at elevated temperature and with simultaneous exertion of shear forces.

9. Granules obtainable from the thermoplastic mixture as claimed in claim 1, by extrusion and pelletization.

10. A biodegradable molded part or sheet comprising the thermoplastic mixture as claimed in claim 1.

11. A thermoplastic mixture as claimed in claim 1 in the form of molded parts or sheets.

12. A thermoplastic mixture as claimed in claim 1 in the form of moldings for controlled release of active ingredients.

13. A thermoplastic mixture as claimed in claim 1 in the form of moldings for producing solid moldings, blowmoldings or combinations thereof.

14. A thermoplastic mixture as claimed in claim 1 in the form of agricultural sheets.

15. A thermoplastic mixture as claimed in claim 1 in the form of food application sheets.

16. A thermoplastic mixture as claimed in claim 1 in the form of food packaging sheets.

17. A thermoplastic mixture as claimed in claim 1 in the form of food packaging sheets with full-area contact with the food.

18. A thermoplastic mixture as claimed in claim 1 in the form of flat or tubular sheets comprising casings for sausage and cheese.

19. A thermoplastic mixture as claimed in claim 1 in the form of temporary protective sheets.

* * * * *